United States Patent [19]

Obler

[11] 4,381,174
[45] Apr. 26, 1983

[54] VARIABLE SPEED DRIVE

[75] Inventor: Henry D. Obler, Lanham, Md.

[73] Assignee: The United States of America as represented by the Administrator of the National Aeronautics and Space Administration, Washington, D.C.

[21] Appl. No.: 238,786

[22] Filed: Feb. 27, 1981

[51] Int. Cl.³ .............................................. F04B 49/00
[52] U.S. Cl. .......................................... 417/15; 474/26
[58] Field of Search .......................... 417/15, 38, 362; 474/17, 26, 8, 28, 18, 27

[56] References Cited

U.S. PATENT DOCUMENTS

| | | | |
|---|---|---|---|
| 2,289,287 | 7/1942 | Hallinan | 474/26 X |
| 2,350,913 | 1/1944 | Mercer | 172/239 |
| 2,369,044 | 2/1945 | Hallinan | 474/26 X |
| 2,448,379 | 8/1948 | Mantle | 417/15 |
| 2,506,738 | 5/1980 | Raypholtz | 103/35 |
| 2,507,904 | 5/1950 | Heller et al. | 57/98 |
| 2,695,529 | 11/1954 | Evans | 74/230.17 |
| 2,927,471 | 3/1960 | Long | 474/26 |
| 3,129,598 | 4/1964 | Buss | 74/230.17 |
| 3,354,749 | 3/1965 | Sadier | 74/745 |
| 3,362,240 | 1/1968 | Beck | 74/230.17 |
| 3,369,417 | 2/1968 | Scott et al. | 74/230.17 |
| 3,425,288 | 2/1969 | Golden et al. | 474/26 |
| 3,685,365 | 8/1972 | Bauer | 74/230.17 |

OTHER PUBLICATIONS

"Design of Machine Elements" by V. M. Faires, MacMillian Co., (1934) pp. 133–136, 159–161.

*Primary Examiner*—Lloyd L. King
*Attorney, Agent, or Firm*—John O. Tresansky; John R. Manning; Robert E. Bushnell

[57] ABSTRACT

A variable speed drive wherein a first embodiment is comprised of a pivotally mounted prime mover (10) coupled to a rotary fluid output device (58), such as a fan or pump, through a variable and fixed pulley drive arrangement (50 and 52) wherein the pivotal position of the prime mover (10) and accordingly the pitch diameter of variable pulley means (50) is controlled in accordance with fluid motor means (26, 28) coupled to the prime mover (10) and which is actuated in response to a fluid feedback control signal derived from a sensed output of the rotary fluid output device (58). The pivotal motion of the prime mover (10) imparts an arcuate motion to the variable pulley means (50) which effects a speed variation of the rotary fluid output device (58) in accordance with the variation of the pitch diameter ratio of opposing variable and fixed pulley means (50 and 52). In a second embodiment, idler pulley means (82 and 84) are pivotally mounted between the prime mover (10) and the rotary fluid output device (58) and an arcuate movement is imparted to the idler pulley means by means of the fluid motor actuator means (94). The idler pulley means (82 and 84) are connected to respective opposing pulleys (96) and (98) located on the shafts of prime mover (10) and the rotary output device (58) with at least one of the pulleys of the combination being variable pulley means which acts to change its pitch diameter in response to arcuate motion of the idler pulley means and accordingly vary the speed of the rotary output device (58).

15 Claims, 6 Drawing Figures

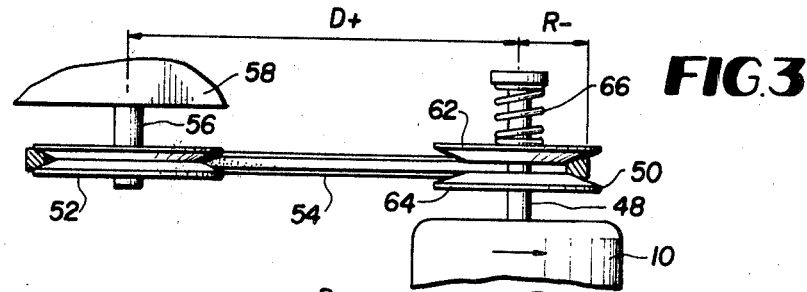
FIG.3
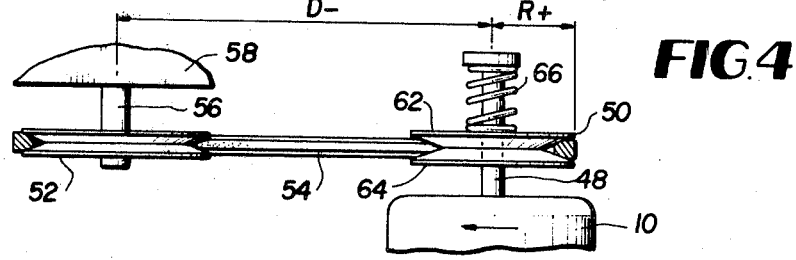
FIG.4
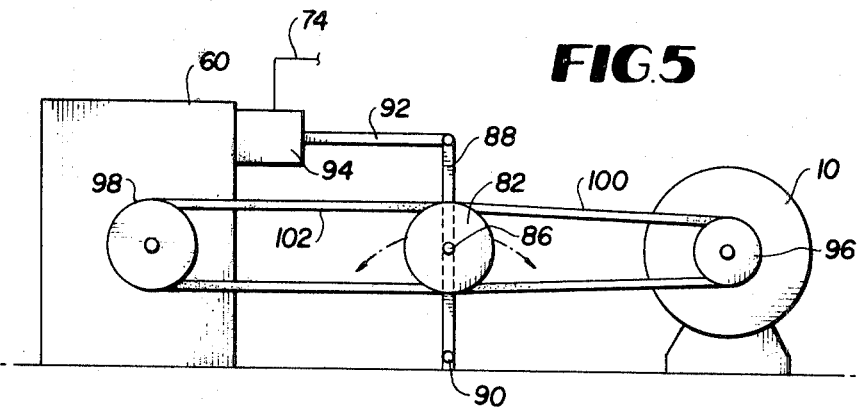
FIG.5
FIG.6
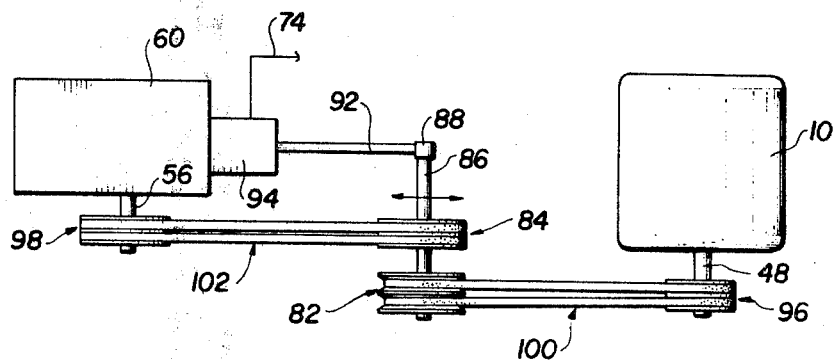

VARIABLE SPEED DRIVE

ORIGIN OF THE INVENTION

The invention described herein was made by an employee of the U.S. Government and may be manufactured and used by or for the Government for governmental purposes without the payment of any royalties thereon or therefor.

TECHNICAL FIELD

This invention relates generally to a system for automatically controlling the speed of a device driven by a prime mover and more particularly to a variable speed drive for fans and pumps and the like.

BACKGROUND ART

Various types of apparatus are known for varying the operational speed of devices driven by a prime mover such as an electric motor. Spring loaded pulleys have been used, for example, for varying speeds by using motor bases which are adapted to have a linear motion. This motion is usually accomplished by turning a handle affixed to a threaded rod which drives a screw to move the motor forward and backward, causing the pulley sheave to open and close, which action is also accompanied by a change in the effective pitch diameter of the pulley. The threaded rod can be turned by a motorized reduction gear; however, this requires a means to stop and start the motor at the end of its travel, as well as a means to reverse the direction of travel.

A chief limitation of known prior art variable speed drives is the relatively sophisticated means employed to achieve their objective and as a result are relatively complex, costly and difficult to implement. This is particularly true with respect to direct current drives, fluid drives, PIV drives and eddy current clutches. While such drives have particular utilization where very accurate speed control is required over a relatively large speed range, fan and pump speed control do not require ranges of speed which are as great nor do they require a high degree of accuracy.

STATEMENT OF THE INVENTION

Accordingly, it is an object of the present invention to provide an improvement in variable speed drives.

Another object of the invention is to provide an improved variable speed drive for fans and pumps.

Still another object of the invention is to provide an improvement in variable speed drives for fans and pumps which operates automatically in a closed loop system in response to a feedback signal.

A further object of the invention is to provide improvement in a closed loop variable speed drive for fans and pumps which responds automatically to a change in sensed pressure or temperature, etc.

These and other objects are provided in accordance with a variable speed drive having pivoted pulley means driven by a prime mover. The pivoted pulley means are coupled to opposing pulley means which drive a rotary fluid output device such as a fan or pump. The pivoted pulley means are arcuately moved by a fluid damper motor actuated in response to a fluid feedback signal derived from a sensed output of the rotary fluid output device. The arcuate motion imparted to the pivoted pulley means acts to vary the ratio of the pitch diameter of at least one of the pulley means and thus impart a speed variation to the rotary fluid output device.

The foregoing as well as other objects, features and advantages of the invention will become more apparent from the following detailed description when taken in conjunction with the appended drawings.

BRIEF DESCRIPTION OF THE DRAWINGS

FIGS. 3 and 4 are diagrams illustrative of the operation of a spring-biased variable pulley arrangement helpful in understanding the operation of the embodiment shown in FIG. 1;

FIG. 5 is a front plan view generally illustrative of a second embodiment of the subject invention; and FIG. 6 is a top plan view of the embodiment shown in FIG. 5.

DETAILED DESCRIPTION OF THE INVENTION

Figure 1:
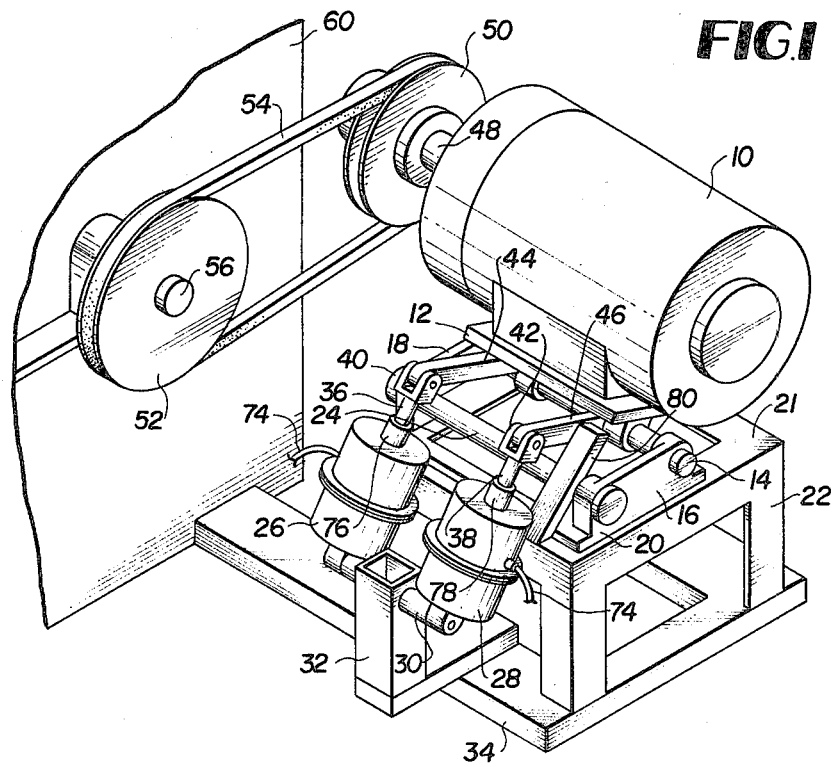
FIG. 1 is a perspective view generally illustrative of the preferred embodiment of the subject invention.

Referring now to the drawings wherein like reference numerals refer to like parts throughout, the preferred embodiment of the invention as depicted in FIG. 1 includes a prime mover 10, preferably a constant speed electric motor, which is mounted on a movable base 12 pivotally attached to a pivot pin or rod 14. The rod 14 is horizontally held in place by means of a pair of opposing end pieces 16 and 18 of a generally rectangular support structure 20 which is mounted on the top surface 21 of a pedestal type frame 22. For the sake of rigidity, a cross member 24 spans the end pieces 16 and 18 along with the pivot rod 14. The motor 10 is pivoted about the pivot rod 14 by means of a pair of pneumatic (air) damper motors 26 and 28 which are pivotally attached at their lower ends to a pivot member 30 secured to a right angled channel bracket 32 attached to the element 34 of the frame 22. Each of the damper motors 26 and 28 includes spring biased pistons, not shown, coupled to respective piston rods 36 and 38 which terminate in bifurcated clevis mount assemblies 40 and 42 which connect to outwardly projecting motor base members 44 and 46. As will be described, the action of the damper motors 26 and 28 operates to vary the angular position of the base 12 upon which the motor 10 is mounted.

Figure 2:
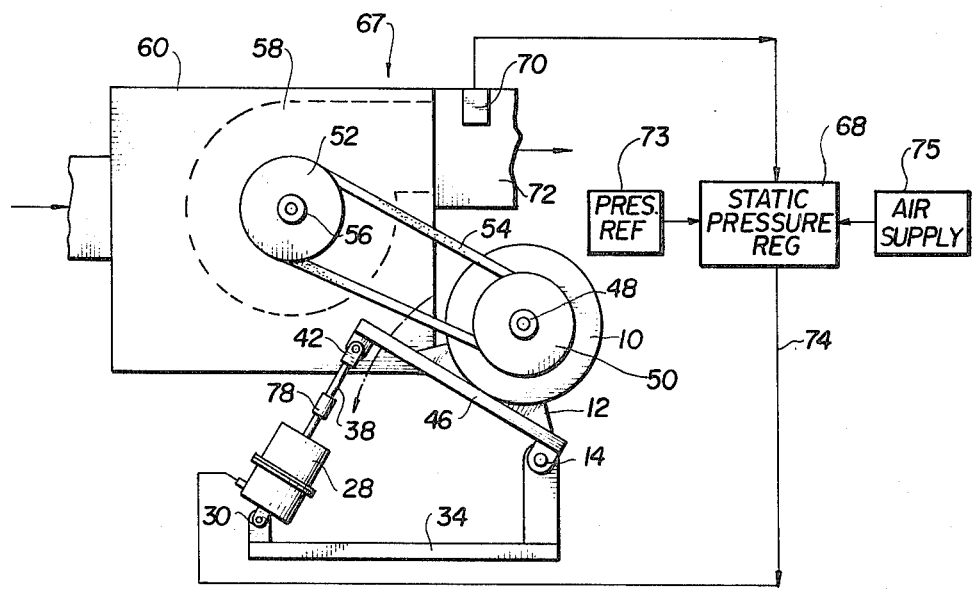
FIG. 2 is a schematic diagram illustrative of the embodiment of the invention shown in FIG. 1.

Considering FIG. 1 further, the motor 10 includes a shaft 48 to which is attached a drive pulley 50. The pulley 50 is comprised of a well known spring biased variable sheave pulley hereinafter referred to simply as a variable pulley, which is coupled to an opposing driven pulley 52 by means of a belt 54. The pulley 52 is has a fixed sheave pulley hereinafter referred to as a fixed pulley. The fixed pulley 52 in turn is mounted on a shaft 56 which couples to a rotary device such as a centrifugal fan 58 located in a ductwork housing 60 as shown in FIG. 2. While a fan is shown in the preferred embodiment of the invention, a pump or other similar type of fluid moving output device can be driven by the combination of elements shown in FIG. 1.

Accordingly, as the motor 10 pivots on the axis defined by the pivot rod 14, the variable pulley 50, which as noted above constitutes the driver pulley, moves either closer or farther from the driven fixed pulley 52 and accordingly the pitch diameter of the sheave of the variable pulley 50 changes as the pulley sheave is forced open by the movement of the motor 10 as shown in FIGS. 3 and 4.

Referring briefly now to FIGS. 3 and 4, the sheave of the variable pulley 50 is shown having a pair of opposing flanges 62 and 64 which are urged together by means of a compression spring 66. As shown in FIG. 3, the motor 10 is shown moving away from the fixed pulley 52 and accordingly the tension of the belt 54 spreads the flanges 62 and 64, causing the effective diameter of the sheave to decrease, which has the effect of decreasing the rotational speed of the fixed pulley 52 and accordingly the rotational speed of the fan 58. Alternatively, as shown in FIG. 4, movement of the motor towards the fixed pulley 52 causes less tension on the belt 54, causing the flanges to move closer together under the bias action of the spring 66 whereupon the effective sheave diameter increases. This in turn causes the rotational speed of both the fixed pulley 52 and fan 58 to increase. Such operation of a variable and fixed pulley combination is well known and accordingly requires no further explanation.

Referring now to FIG. 2, schematically disclosed is a closed loop control system incorporating the apparatus shown in FIG. 1. The centrifugal fan 58 is adapted, for example, to supply a variable volume air system, not shown, which requires a constant static pressure to be maintained in a ductwork distribution system 67 so that sufficient air flow is available at the various terminals. Hence the need for a variable speed control. Accordingly, a static pressure regulator 68 is included in the system which is suitable to respond to an actual sensed pressure signal generated by a static pressure sensor 70 located in the output duct 72 as well as a pressure reference signal corresponding to a desired pressure which is supplied from a source 73. The regulator 68 compares both pressure signals and operates to feed the proper air pressure to a line 74 coupled to the damper motors 26 and 28 which operate to extend or retract the piston rods 36 and 38 and in turn causes the motor 10 to move in an arc-like motion around the pivot 14. The limits of arcuate movement is controlled between the fully extended position of the piston rods and a predetermined retracted position by the collars 76 and 78. In addition, an inclined bar member 80 (shown in FIG. 1) is secured to the frame 22 to act as an abutment limit for the downward travel of the motor base 12.

While a variable speed drive for a fan has been described, the same principles extend to a drive for a water pump, for example, in a domestic water system which requires a fixed pressure to operate various appliances and which is obtainable by varying the speed of the pump in accordance with an arrangement such as shown in FIGS. 1 and 2. The advantage of the arc-like motion of the mechanism thus disclosed is its relatively low friction which therefore requires little force to actuate the motion that forces the variable pulley 50 open. While a single pulley arrangement has been shown for purposes of illustration, it should be understood that when desirable two or more parallel pulleys can be utilized, depending upon the power transmission requirements of a particular application.

A second embodiment of the invention is shown in FIGS. 5 and 6 and involves pivoting two sets of idler pulleys 82 and 84 which are mounted on a common shaft 86 located on a lever arm member 88 which is connected at its lower end to a pivot 90 and at its upper end to the end of a piston rod 92 of a damper motor 94. The damper motor 94 is operable as described above with respect to the first embodiment in accordance with air supplied thereto from the static pressure regulator 68 shown in FIG. 2 by way of the line 74. Opposite the two sets of idler pulleys 82 and 84 are respective sets of pulleys 96 and 98 which are mounted on the motor shaft 48 and the shaft of the fan 56. The interconnection of the pulleys is made by two sets of belts 100 and 102. Both sets of idler pulleys 82 and 84 are shown in FIG. 6 having variable pulleys with opposing pulleys 96, 98, respectively, being fixed pulleys. As shown, one idler pulley 82 is open while the other pulley 84 is closed. Such an arrangement provides a double acting variable speed drive. Alternatively, one or more of the pulleys 82, 84, 96 and 98 may be arranged in various combinations of variable and fixed pulleys; in some applications it may be desirable for all of the pulleys to be variable pulleys.

In operation, the arc-like motion imparted to the lever 88 by the damper motor 94 is suitable to reduce or increase the distance between the motor 10 and the shaft 86 and thus increase or reduce the distance between the shaft 86 and the driven element coupled to the shaft 56. Where both sets of idler pulleys 82 and 84 are variable, as the shaft 86 is rotated closer to the motor 10, the set of pulleys 82 closes and the shaft 86 rotates slower. At the same time the pulley set 84 opens and the speed of the shaft 56 also decreases. Thus increasing or decreasing the speed of the driven device is a function of the ratios of the pitch diameters of the respective pulleys, as before, but now as a product of the ratios of the pitch diameters. In the various embodiments set forth above, the static pressure regulator 68 may be constructed with a model R-317 Air Flow Controller available from Johnson Controls, Inc.

Having thus shown and described what is at presented considered to be the preferred embodiments of the invention, all modifications, changes and alterations coming within the spirit and scope of the invention as defined in the appended claims are herein meant to be included.

What is claimed is:

1. A variable speed drive for a rotary device (58) powered from a prime mover (10), comprising:
   fixed pulley means (52/98) located on the shaft (56) of said rotary device;
   variable pulley means (50/82, 84) located on and driven by the shaft (48) of said prime mover (10), said variable pulley means and said prime mover being pivoted about an axis (14/90);
   means (54/102) coupling said fixed pulley means (52/98) to said variable pulley means (50/82, 84);
   a base member (12) supporting said prime mover (10), pivoted about said axis;
   means including a fluid damper motor (26, 28) having a pivotally mounted pneumatic motor and an air operated piston (36, 38) connected to an extensible and a retractable rod member (36, 38) coupled to said base member, operable to impart an arcuate motion to both said prime mover and said variable pulley means in response to a fluid control signal coupled to said fluid motor means (26, 28) whereby the ratio of the pitch diameters of said fixed and variable pulley means are varied to impart a speed variation to said rotary device (58);
   fluid circuit means (68) operable in response to fluid input signals corresponding to the desired and actual speed of said rotary device (58) to provide a fluid feedback control signal; and means (74) coupling said fluid control signal to said fluid motor means (26, 28).

2. The variable speed drive as defined by claim 1 wherein said rotary device (58) comprises a fluid output device, and wherein said fluid circuit means (68) includes fluid pressure regulator means whose fluid input signal comprises a static pressure signal corresponding to the output of said rotary fluid output device (58) and a reference pressure signal, said signals corresponding to the desired and actual speeds, respectively of said fan or pump.

3. The variable speed drive as defined by claim 1 wherein said prime mover (10) comprises an electric motor.

4. The variable speed drive as defined by claim 1 wherein said base member (12) includes at least one outwardly projecting member (44, 46) extending toward said fluid damper motor (26, 28) and wherein said respective piston (36, 38) terminates in a bifurcated member (40, 42) pivotally coupled to said outwardly projecting member (36, 38).

5. The variable speed device as defined by claim 1 and additionally including a clevis mount assembly (40, 42) coupling said respective retractable rod member (36, 38) to said base member (12).

6. The variable speed drive as defined by claim 1 and additionally including means (76, 78) for limiting the travel of said retractable rod member (36, 38) at least in its retracted position.

7. A variable speed drive for a rotary device (58) powered from a prime mover (10), comprising:
   first pulley means (98) located on the shaft (56) of said rotary device;
   idler pulley means (82, 84) driven by said prime mover and located intermediate said prime mover and said rotary device, said idler pulley means being pivoted about an axis;
   third pulley means (96) located on the shaft (48) of said prime mover;
   one of said pulley means (82, 84, 96, 98) having a fixed pitch diameter and at least one of said pulley means (82, 84, 96, 98) having a variable pitch diameter;
   means including fluid motor means (26, 28) operable to impart an arcuate motion to said idler pulley means (82, 84) in response to a fluid control signal coupled to said fluid motor means (26, 28) whereby the ratio of the pitch diameters of said first and second pulley means are varied to impart a speed variation to said rotary device (58);
   fluid circuit means (68) operable in response to fluid input signals corresponding to the desired and actual speed of said rotary device (58) to provide a fluid feedback control signal; and
   means (74) coupling said fluid control signal to said fluid motor means (26, 28).

8. The variable speed drive as defined by claim 7 wherein said idler pulley means (82, 84) includes at least one variable pulley.

9. The variable speed drive as defined by claim 7 wherein said idler pulley means (82, 84) includes a pair of pulley means,
   one pulley means (84) of said pair being coupled to said first pulley means (98) and the other pulley means (82) of said pair being coupled to said third pulley means (96) thereby providing two sets of coupled pulleys.

10. The variable speed drive as defined by claim 9 wherein one pulley means (82, 84) of each set includes at least one variable pulley to provide a double acting variable speed drive.

11. The variable speed drive as defined by claim 9 wherein said pair of idler pulley means (82, 84) are located on a common shaft (86).

12. The variable speed drive as defined by claim 11 wherein said pair of idler pulley means (82, 84) both comprise variable pulley means.

13. The variable speed drive as defined by claim 11 wherein said common shaft (86) forms part of a pivotally mounted lever arm (88) coupled to said fluid motor means (94).

14. The variable speed drive as defined by claim 13 wherein said rotary device (58) comprises a fluid output device.

15. The variable speed drive as defined by claim 13 wherein said prime mover (10) comprises an electric motor.

* * * * *